Nov. 14, 1961  MASAO TSUDA  3,008,155
DRILLING AND THREAD CUTTING MACHINE
Filed May 1, 1957  2 Sheets-Sheet 1

United States Patent Office 3,008,155
Patented Nov. 14, 1961

3,008,155
DRILLING AND THREAD CUTTING MACHINE
Masao Tsuda, 38 Senjyu-Sakaecho, Adachi-ku,
Tokyo, Japan
Filed May 1, 1957, Ser. No. 656,382
3 Claims. (Cl. 10—136)

This invention relates to a drilling and thread cutting machine, more particularly a drilling and thread cutting machine comprising a motor operable in normal direction during the drilling and thread cutting operation and, when the operation is completed, a spindle carrying a drill tap is automatically raised by a change over switch which is operated by a switch lever through a member associated with the spindle and thus by reversing the rotation of the motor thereby withdrawing the drill tap from the hole pierced in the worked article. For this purpose, a switch operating member and a descending motion controlling member are adjustably fixed on an adjustment rod associated with the spindle, and a pinion shaft is provided to control up and down motion of the spindle through a pinion fixed on the pinion shaft and a rack associated with the spindle and in engagement with the pinion. According to this invention, the pinion shaft is urged to turn by stored energy for example by energy of a spiral spring in the direction of raising the spindle and has on the extension an engagement part which is engageable with the teeth provided on the internal circumference of a sliding sleeve. This sliding sleeve is slidable on the pinion shaft to come into or depart from the engagement with the engagement portion of the pinion shaft, and when a ring having an inclined surface provided on the sleeve comes into engagement with the descending motion controlling member on the adjustment rod above mentioned, the sleeve is moved to be released from the engagement with the pinion shaft. A fixed support is provided around the pinion shaft and a handle is pivoted in said support, the end of the handle being in engagement with the sleeve above mentioned. Accordingly the sleeve can also be operated by this handle to bring into or depart from the engagement with the pinion shaft.

When the sleeve is departed from the engagement with the pinion shaft, the latter will be free to rotate in the direction of raising the spindle by stored energy mentioned before, for example, by a spiral spring. According to this invention, the lowering motion of the spindle is controlled automatically and the spindle is raised by the stored energy as described in the above. Furthermore, the direction of the rotation of the spindle is automatically reversed when the thread cutting operation is completed to withdraw the drill tap smoothly from the pierced threaded hole of the worked article by turning the spindle and the drill tap along the thread of the hole with no coercion in operation thereby avoiding any chance of damaging the cutting tool and making continuous thread cutting operation at high speed and efficiency possible. This is a significant improvement in precise industry in mass production.

In the construction of conventional drilling and thread cutting machines, the spindle is generally connected with a handle, and when thread cutting operation is finished and change over of the direction of the motor is carried out by a switch to reverse the rotation of the drill tap, the handle is moved by the lead of the thread when the diameter of the hole is sufficiently large and the spindle is raised. However, when the diameter of the thread is small, the load on the thread is excessive and the thread is broken often. Accordingly it has been necessary to apply a force to the handle by a hand according to the rising speed of spindle determined by the pitch of the thread in order to avoid such a break. Such an operation is rather delicate and requires much experience and tends to become a reason for causing a substantial amount of unsatisfactory products in mass production.

According to this invention, the handle is separated from not only the spindle but also from a pinion shaft controlling the up and down motion of the spindle, and the withdrawing of the drill tap can be effected smoothly.

According to another aspect of this invention, a friction clutch is provided between the driving motor and the spindle carrying the drill tap. It is well known fact that the load on the drill tap is varied greatly from time to time when it carries out simultaneously drilling and thread cutting operations, and the temporary excessive load causes often damage on the drilling and thread cutting tool and hence it is very difficult to achieve continuous satisfactory operation with no damage of the drill tap interrupting the operation. The friction clutch allows slip in the clutch to stop or slow down the rotation of the spindle temporarily when the drill tap meets an excessive load and thus the chance of breaking the drill tap can be eliminated.

The above mentioned and other characteristics and advantages of this invention may be more clearly understood as the following description proceeds with reference to accompanying drawing showing one preferred embodiment of this invention, in which.

Figure 1:
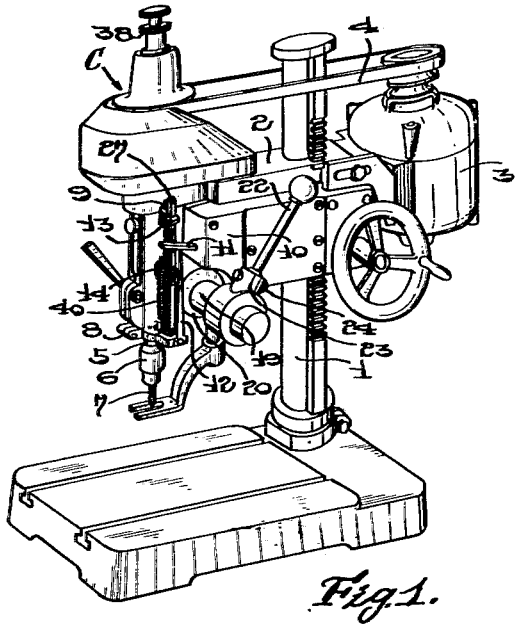
FIG. 1 is a perspective view of a machine according to this invention.

A motor 3 is mounted on a supporting arm 2 supported by a stand 1, and a spindle 5 is driven by this motor 3 through a belt 4 and a friction clutch C. A drill tap 7 is mounted on the spindle 5 by a chuck 6. On a plate 8 fixed on the spindle 5 are mounted an adjustment rod 9 and a pushing rod 12 which operates a switch lever 11 of a change over switch 10. The adjustment rod 9 is provided with an operation member 13 and a controlling member 14 adjustable mounted on the rod in a fixed position respectively. The functions of these members will be made clear hereinafter.

Figure 5:
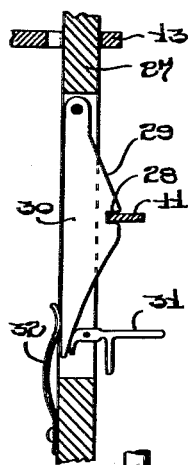
FIG. 5 is a longitudinal sectional view showing the device controlling the engagement of the switch lever of the machine.

On a member 27 (FIG. 5) fixed on the frame of the machine is pivoted a locking piece 30 which has a locking slot 28 and an inclined surface 29. On the end of said fixed member 27 are provided a spring 32 which urges the locking piece in one direction (in the embodiment to right) and also an unlocking member 31 which is pivoted on the member 27 and is operable by hand to unlock the locking piece from a switch lever 11.

Figure 2:
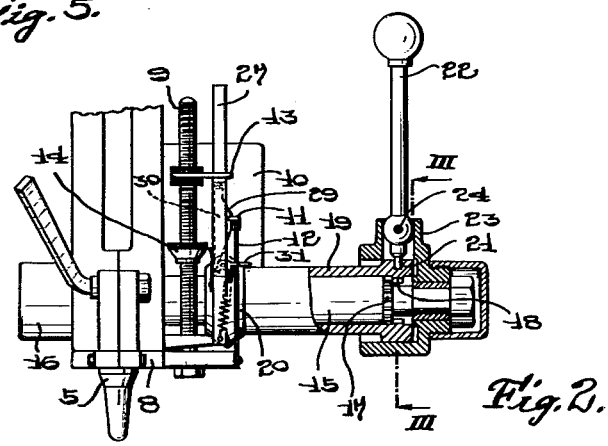
FIG. 2 is an elevation of the system controlling up and down motion of the spindle of the machine, partly shown in section.

The spindle 5 has a rack and this rack is in meshing engagement with a pinion fixed on a pinion shaft 15, and thus the spindle 5 can be raised or lowered through the rotation of the pinion shaft 15. One end of the pinion shaft is in an energy storing box 16 and the spindle is urged to rotate in the direction of raising the spindle 5 through the pinion and the rack by means of a spiral spring 40 one end of which is fixed on the energy storing box and the other end of which is fixed on the pinion shaft 15. The pinion shaft 15 has also a gear 17 (FIG. 2) which is in engagement with teeth 18 provided on the internal circumference of a sliding sleeve 19 slidably journalled on the pinion shaft 15.

Figure 3:
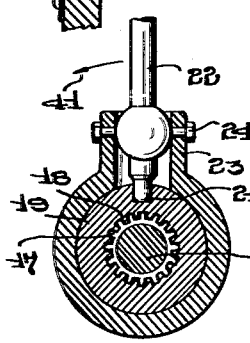
FIG. 3 is a sectional view taken along the line III—III of FIG. 2.
Figure 2A:
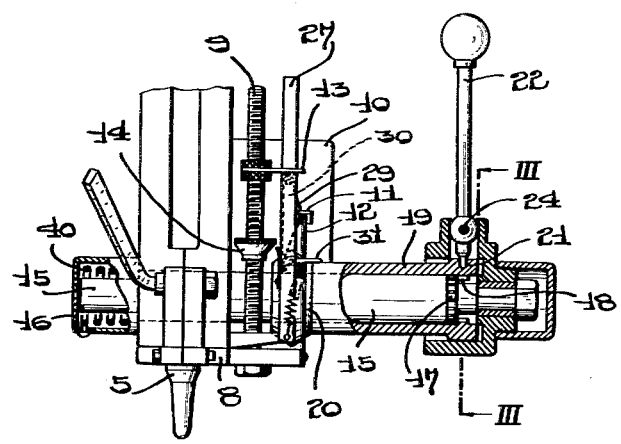
FIG. 2a is an enlarged portion of FIG. 2 illustrating the spiral spring in the energy storing box.

The sliding sleeve 19 is provided with a ring 20 having an inclined surface and a hole 21. Around the sliding sleeve 19 is provided a fixed support 23 (FIGS. 3 and 4) which is fixed on the pinion shaft 15, and a handle 22 is pivoted on said support 23 by a pin 24 and the end of said handle 22 is engaged in the hole 21 of the sliding sleeve 19.

Figure 4:
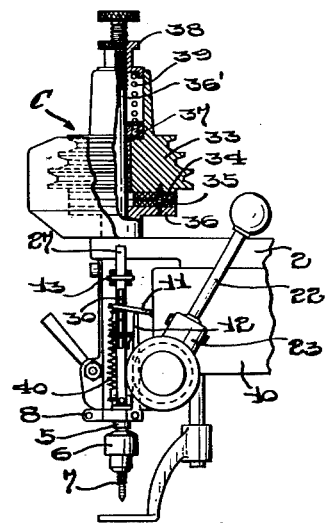
FIG. 4 is a side view of the system controlling the direction of the motor of the machine, to normal or reversed direction, shown partly in section.

Now the construction of the friction clutch C will be explained. In FIG. 4, a pulley 33 and a pulley 36 are in friction engagement with each other on their faces. The pulley 33 is driven by the belt 4 driven by the motor 3 and the pulley 36 is in engagement with the spindle 5 so that the spindle may be rotated by the pulley 36 when it is rotated by the friction between the two pulleys. On the engagement surface of the pulley 33 is fixed a leather friction plate 34 and on the surface of the pulley is fixed a friction plate 35 of proper material, for example hard rubber. The pulley 33 is journaled on a shaft 36' by a ball bearing 37 and is pressed by a spring 39 to bear against the friction plate 35 of the pulley 36. The pressing force of the spring 39 is adjustable by means of a nut 38.

When the motor 3 is started to rotate, the pulley 33 is rotated by the belt 4 and the pulley 36 is rotated through the friction between the friction plates 34 and 35 to turn the spindle 5 together with the drill tap 7. Then, by manually swinging the handle 22 to the right (as viewed in FIG. 2) about the pivot 24, the sliding sleeve 19 is slid on the shaft 15 to the left (as viewed in FIG. 2), to effect clutching engagement of the teeth 17, 18 and to bring the inclined surface 20 of the sliding sleeve 19 into the path of the member 14. Now keeping the handle 22 in this position, the handle will be turned to the front, namely in the direction of the arrow 41 in FIG. 3 to turn the pinion shaft 15. The spiral spring in the energy storing box 16 is wound by the rotation of the pinion shaft 15 and at the same time the spindle 5 is lowered together with the fixed plate 8 and the adjustment rod 9 because the rack is in engagement with the pinion of the pinion shaft 15. Thus drilling and thread cutting operation will be carried out by the drill tap 7.

As the spindle 5 is lowered according to the proceeding of drilling and thread cutting, the adjustment rod 9 is also lowered to bring the inclined surface of the controlling piece 14 on said rod into engagement with the inclined surface 20 on the sliding sleeve 19 to move the sliding sleeve 19 to right against the manual force which acts to urge the sleeve to the left. When the thread cutting operation is completed the sleeve 19 is sufficiently moved to right to disengage the teeth 18 of the sleeve 19 from the teeth 17 of the pinion shaft 15. Now the spindle may be turned in reversed direction by the stored energy of the spiral spring 40 in the energy storing box 16 and the spindle 5 will be raised through the action of the pinion and the rack. The operation member 13 on the adjustment rod 9 is lowered when the spindle is lowered and, through the engagement on the inclined surface 29 of the locking piece 30, acts to turn said piece in clockwise direction to release the switch lever 11 from the locking hole 28. The position of the operation member 13 on the adjustment rod 9 is adjustable, and it is so adjusted as to effect the release of the switch lever 11 when the thread cutting operation is completed. The switch lever 11 is always pulled downwardly by a spring 40 one end of which is fixed on a fixed part of the machine and the other end is fixed on the switch lever 11, and so the lever is now pulled to a lower position to turn the motor 3 in reversed direction. Thus the change over switch 10 will be automatically operated for driving the motor reversely on the completion of the thread cutting operation and the drill tap 40 will be now withdrawn automatically along the thread in the worked piece.

When the spindle is raised, the plate 8 fixed on the spindle is also raised with the adjustment rod 9 and the pushing rod 12, and the pushing rod 12 abuts against the lowered switch lever 11 to raise it against the action of the spring 40. The locking piece 30 is always urged to contact with the switch lever 11 and, when the switch lever is raised to the hole 28 by the pushing rod 12, the lever is brought into engagement with the locking hole 28 and is locked by the locking piece 30. Now the change over switch 10 is operated to change the drive of the motor 3 from reversed direction to normal direction, and the machine is ready for the next operation of thread cutting.

According to this invention, the spindle 5 of the drill tap 7 is operated through a special friction clutch C and when the variation of the load is excessive, the friction plate 35 for driving the spindle is allowed to make slip to stop or to lower the speed of the rotation of the spindle and thus the drill tap 7 may be temporarily released from an excessive load and hence the damage of the drill tap which may otherwise be caused can be completely prevented. The force of the friction engagement in the clutch C is adjustable, and the reversed operation of the motor 3 can be effected at any time even during the operation of thread cutting by the operation of the locking piece 30 through the unlocking member 31 of manual handling in order to take a proper step in emergency.

All the operations such as change over from normal turn to reversed turn and the control of the depth of the drilled hole are all automatically controlled, and therefore it is very convenient in operation and can increase the efficiency by eliminating the damage of the drill tap which has been a serious problem interrupting the drilling and thread cutting operation.

What is claimed is:

1. In a drilling and tapping machine including a spindle carrying a tapping drill and a reversible motor for driving the spindle; a feed mechanism comprising a pinion shaft having a pinion for raising and lowering the spindle and having teeth on one end, a sleeve slidably mounted on the pinion shaft and having teeth for clutching engagement with the teeth on said pinion shaft, a manually operable handle for firstly sliding the sleeve on the pinion shaft to effect the clutching engagement of their teeth and secondly rotating the sleeve with the pinion shaft to effect the lowering of the spindle, means for automatically sliding back the sleeve on the pinion shaft to effect disengagement of their teeth at the end of the lowering stroke of the spindle, and means for reversing the reversible motor to raise the spindle when the sleeve is slid back on the pinion shaft.

2. In a drilling and tapping machine including a spindle carrying a tapping drill, a control member adjustably fixed to the spindle and a reversible motor for driving the spindle; a feed mechanism comprising a pinion shaft having a pinion for raising and lowering the spindle and having teeth on one end, a sleeve slidably mounted on the pinion shaft and having teeth for clutching engagement with the teeth on said pinion shaft, a manually operable handle for firstly sliding the sleeve on the pinion shaft to effect the clutching engagement of the teeth and secondly rotating the sleeve with the pinion shaft to effect lowering of the spindle, said sleeve being operatively engaged with and controlled by the control member of the spindle at the end of the lowering stroke so that it slides back on the pinion shaft to disengage the teeth, and means for automatically reversing the reversible motor to raise the spindle when the sleeve is slid back on the pinion shaft.

3. A feed mechanism according to claim 2, wherein the control member has a conical surface and the sleeve has also a conical surface for engaging the conical surface of the control member, so that at the end of the lowering stroke of the spindle the conical surface on the control member engages the conical surface of the sleeve to slide back the sleeve on the pinion shaft.

References Cited in the file of this patent

UNITED STATES PATENTS

| | | |
|---|---|---|
| 457,974 | Sampson | Aug. 18, 1891 |
| 1,124,070 | Staley | Jan. 5, 1915 |
| 1,607,667 | Essen | Nov. 23, 1926 |
| 1,640,177 | Bishop | Aug. 23, 1927 |
| 1,991,927 | Hermann | Feb. 19, 1935 |
| 2,269,064 | Rideout | Jan. 6, 1942 |
| 2,693,731 | Mobius | Nov. 9, 1954 |
| 2,813,280 | Huffman | Nov. 19, 1957 |